US009169945B2

(12) United States Patent
Pint et al.

(10) Patent No.: US 9,169,945 B2
(45) Date of Patent: Oct. 27, 2015

(54) DEVICE FOR DISCHARGING CONDENSATE FOR A HOUSING OF A MOTOR VEHICLE CLOSED OFF FROM THE ENVIRONMENT, HOUSING, AND MOTOR VEHICLE

(71) Applicant: Bayerische Motoren Werke Aktiengesellschaft, Munich (DE)

(72) Inventors: Siegfried Pint, Munich (DE); Robert Lustig, Munich (DE); Robert Loeffler, Moosburg (DE); Martin Heger, Kreuzholzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/625,410

(22) Filed: Sep. 24, 2012

(65) Prior Publication Data
US 2013/0126008 A1 May 23, 2013

Related U.S. Application Data

(63) Continuation of application No. PCT/EP2011/054217, filed on Mar. 21, 2011.

(30) Foreign Application Priority Data

Mar. 25, 2010 (DE) .......................... 10 2010 003 257

(51) Int. Cl.
*F16K 51/00* (2006.01)
*B60H 1/00* (2006.01)
(Continued)

(52) U.S. Cl.
CPC ................. *F16K 51/00* (2013.01); *B60H 1/005* (2013.01); *B60H 1/3233* (2013.01); *F16T 1/00* (2013.01); *F16T 1/38* (2013.01); *F24F 2013/227* (2013.01); *Y10T 137/4471* (2015.04)

(58) Field of Classification Search
CPC ..................... H01M 2250/20; H01M 10/5079; H01M 8/04156; H01M 8/04164; H01M 2/0215; H01M 2/1061; H01M 10/4257; H01M 2/1066; H04M 1/0262; B60R 16/04; Y10T 137/3003; Y10T 37/3021; Y10T 37/3028; Y10T 37/3031; Y10T 37/4471; Y10T 37/5762; Y10T 37/5907; Y10T 37/6881; Y10T 37/6855; Y10T 37/85978; Y10T 37/6416; F24F 2013/227; F16T 1/00; F16T 1/38; B60H 1/005; B60H 1/3233
USPC ............ 137/171, 177, 179, 180, 247.13, 312, 137/314, 351, 899, 565.01, 334; 62/285, 62/288, 291; 165/70, 71; 180/68.5
See application file for complete search history.

(56) References Cited

U.S. PATENT DOCUMENTS

| 483,119 A | * | 9/1892 | Nilson | ........................ 137/180 |
| 544,744 A | * | 8/1895 | Nilson | ........................ 137/180 |

(Continued)

FOREIGN PATENT DOCUMENTS

| DE | 35 13 537 A1 | 10/1986 |
| DE | 36 01 391 A1 | 2/1987 |

(Continued)

OTHER PUBLICATIONS

Machine translation for DE411081(A1), Sep. 23, 2013,Espacenet, pp. 1-3.*

(Continued)

*Primary Examiner* — Craig Schneider
*Assistant Examiner* — Craig J Price
(74) *Attorney, Agent, or Firm* — Crowell & Moring LLP

(57) ABSTRACT

A condensate trap is provided for a housing of a motor vehicle that is sealed off from the environment, wherein the housing is provided for accommodating a technical component, in particular a power storage module. A reservoir for accommodating the condensate is formed in or on the floor of the housing. The reservoir forms the lowest point of the floor in a predefined installation situation of the housing. The reservoir is separated from the interior of the housing by a cover, which is provided with at least one breakthrough as an inlet for the condensate, accumulating in the interior. An outlet opening of the reservoir is coupled to an actively actuable element for discharging the condensate.

16 Claims, 2 Drawing Sheets

(51) Int. Cl.
*B60H 1/32* (2006.01)
*F16T 1/00* (2006.01)
*F16T 1/38* (2006.01)
*F24F 13/22* (2006.01)

(56) References Cited

U.S. PATENT DOCUMENTS

| | | | | |
|---|---|---|---|---|
| 2,007,358 A * | 7/1935 | Anger | | 137/204 |
| 2,104,765 A * | 1/1938 | Saunders | | 180/68.5 |
| 2,193,405 A * | 3/1940 | Frederick | | 165/70 |
| 2,196,578 A * | 4/1940 | Greig | | 180/68.5 |
| 2,212,503 A * | 8/1940 | Nickell | | 165/202 |
| 2,501,540 A * | 3/1950 | Ryan | | 62/445 |
| 2,538,660 A * | 1/1951 | Shreve | | 62/277 |
| 3,165,163 A * | 1/1965 | Holka | | 180/68.5 |
| RE26,186 E * | 4/1967 | McQuerry | | 165/71 |
| 3,575,199 A * | 4/1971 | Beattie | | 137/341 |
| 4,016,927 A * | 4/1977 | Palmer | | 165/200 |
| 4,043,353 A * | 8/1977 | Shirey | | 137/204 |
| 4,098,366 A * | 7/1978 | Reinhard et al. | | 180/68.5 |
| 4,249,597 A * | 2/1981 | Carey | | 165/166 |
| 4,327,809 A * | 5/1982 | Fenstermaker | | 180/68.5 |
| 4,336,821 A * | 6/1982 | Frantz et al. | | 137/187 |
| 4,449,692 A * | 5/1984 | Rhodes | | 251/144 |
| 4,637,351 A * | 1/1987 | Pakula | | 123/25 J |
| 4,726,392 A | 2/1988 | Schwarz et al. | | |
| 5,039,927 A * | 8/1991 | Centafanti | | 429/120 |
| 5,086,860 A * | 2/1992 | Francis et al. | | 180/68.5 |
| 5,159,155 A | 10/1992 | Nishihara | | |
| 5,373,830 A * | 12/1994 | Denz et al. | | 123/520 |
| 5,450,833 A * | 9/1995 | Denz et al. | | 123/520 |
| 5,534,364 A * | 7/1996 | Watanabe et al. | | 180/68.5 |
| 5,585,205 A * | 12/1996 | Kohchi | | 429/99 |
| 5,620,057 A * | 4/1997 | Klemen et al. | | 180/68.5 |
| 5,636,655 A | 6/1997 | Kawamura et al. | | |
| 5,749,391 A * | 5/1998 | Loutzenhiser | | 137/204 |
| 5,791,156 A * | 8/1998 | Strautman et al. | | 62/244 |
| 5,894,737 A * | 4/1999 | Haeck | | 62/285 |
| 5,948,298 A * | 9/1999 | Ijaz | | 180/68.5 |
| 6,040,080 A * | 3/2000 | Minami et al. | | 429/96 |
| 6,044,825 A * | 4/2000 | Carter et al. | | 123/557 |
| 6,161,810 A * | 12/2000 | Crow et al. | | 180/68.5 |
| 6,167,946 B1 * | 1/2001 | Uchikawa et al. | | 165/71 |
| 6,188,574 B1 * | 2/2001 | Anazawa | | 361/695 |
| 6,216,811 B1 * | 4/2001 | Herc | | 180/68.5 |
| 6,218,041 B1 * | 4/2001 | Barbier et al. | | 429/96 |
| 6,541,148 B1 * | 4/2003 | Walsh et al. | | 429/434 |
| 6,787,698 B2 | 9/2004 | Higuchi et al. | | |
| 6,868,689 B1 * | 3/2005 | McNeil et al. | | 62/285 |
| 7,112,387 B2 * | 9/2006 | Kimoto et al. | | 429/99 |
| 7,771,663 B2 * | 8/2010 | Reiser et al. | | 422/105 |
| 7,878,019 B2 * | 2/2011 | Cantolino | | 62/285 |
| 8,210,301 B2 * | 7/2012 | Hashimoto et al. | | 180/68.5 |
| 8,276,697 B2 * | 10/2012 | Takasaki | | 180/68.5 |
| 8,286,743 B2 * | 10/2012 | Rawlinson | | 180/68.5 |
| 8,464,817 B2 * | 6/2013 | Usami et al. | | 180/68.5 |
| 8,469,129 B2 * | 6/2013 | Mildner et al. | | 180/68.5 |
| 8,702,161 B2 * | 4/2014 | Charbonneau et al. | | 296/209 |
| 8,733,488 B2 * | 5/2014 | Umetani | | 180/68.5 |
| 8,739,907 B2 * | 6/2014 | Storc et al. | | 180/68.5 |
| 8,835,033 B2 * | 9/2014 | Choi et al. | | 429/100 |
| 8,877,364 B2 * | 11/2014 | Hashimura et al. | | 429/100 |
| 2006/0070658 A1 * | 4/2006 | Nakata et al. | | 137/312 |
| 2008/0047289 A1 * | 2/2008 | Patrick et al. | | 62/285 |
| 2008/0110812 A1 * | 5/2008 | Jensen et al. | | 137/1 |
| 2008/0135107 A1 * | 6/2008 | Noh | | 137/334 |
| 2009/0159239 A1 * | 6/2009 | Desai et al. | | 165/71 |
| 2009/0298311 A1 * | 12/2009 | Nakanishi et al. | | 439/76.2 |
| 2012/0298239 A1 * | 11/2012 | Hodgson et al. | | 137/899 |
| 2012/0301765 A1 * | 11/2012 | Loo et al. | | 429/100 |
| 2013/0068421 A1 * | 3/2013 | Army | | 165/70 |
| 2014/0262573 A1 * | 9/2014 | Ito et al. | | 180/68.5 |
| 2014/0284125 A1 * | 9/2014 | Katayama et al. | | 180/68.5 |

FOREIGN PATENT DOCUMENTS

| | | |
|---|---|---|
| DE | 41 10 081 A1 | 10/1992 |
| DE | 44 98 935 C2 | 4/2001 |
| DE | 198 61 173 B4 | 9/2004 |
| DE | 103 30 569 B4 | 2/2007 |
| EP | 0 930 686 A1 | 7/1999 |
| FR | 2 306 098 A1 | 10/1976 |
| FR | 2 624 809 A1 | 6/1989 |
| JP | 01260231 A * | 10/1989 |
| JP | 01306736 A * | 12/1989 |
| JP | 03211329 A * | 9/1991 |
| JP | 04288419 A * | 10/1992 |
| JP | 05071758 A * | 3/1993 |
| JP | 05164345 A * | 6/1993 |
| JP | 10-129246 A | 5/1998 |
| JP | 2009-108761 A | 5/2009 |

OTHER PUBLICATIONS

Machine translation for FR2624809, Sep. 23, 2013, Espacenet, pp. 1-3.*

International Preliminary Report on Patentability (PCT/IB/373), including Written Opinion (PCT/ISA/237) dated Dec. 4, 2012 (seven (7) pages).

German Search Report dated Jul. 2, 2010 w/English translation (nine (9) pages).

International Search Report dated Oct. 8, 2012 w/Partial English translation (six (6) pages).

* cited by examiner

DEVICE FOR DISCHARGING CONDENSATE FOR A HOUSING OF A MOTOR VEHICLE CLOSED OFF FROM THE ENVIRONMENT, HOUSING, AND MOTOR VEHICLE

CROSS-REFERENCE TO RELATED APPLICATIONS

This application is a continuation of PCT International Application No. PCT/EP2011/054217, filed Mar. 21, 2011, which claims priority under 35 U.S.C. §119 from German Patent Application No. DE 10 2010 003 257.3, filed Mar. 25, 2010.

BACKGROUND AND SUMMARY OF THE INVENTION

The invention relates to a device for discharging a condensate for a housing of a motor vehicle that is sealed off from the environment, wherein this housing is provided for accommodating a technical component, in particular a power storage module (such as battery cells or capacitors). Furthermore, the invention relates to a housing for a power storage module as well as to a motor vehicle comprising a device for supplying the power.

Housings, which are provided for accommodating a technical component, such as a power storage module for a vehicle, have to fulfill a number of requirements, in order to meet the changing operating conditions of a vehicle. Such a housing serves the purpose of protecting the power storage module against environmental influences, such as water and dirt. Typically, the heat that is generated when the power storage module is operating is dissipated from the interior of the housing by means of a cooler, or more specifically, a coolant evaporator. Therefore, the moisture, which penetrates into the interior of the housing due to the air exchange, can condense in the interior of the housing because of the refrigerant cooling. This condensate typically collects on the floor of the housing, from which it has to be drained. At the same time it has to be ensured that the transversal and longitudinal vehicle acceleration that takes place when the vehicle is running does not prevent a reliable discharge of the condensate. Furthermore, the approach for discharging the condensate must also take into consideration that the condensate discharge does not allow impurities and water to penetrate into the housing, a state that would impair the function of the power storage modules.

The use of float valves are known from the prior art in order to achieve a condensate discharge. These valves hold open an outlet cross section on the floor of the power storage in order to allow the condensate to drain continuously. The float valve closes the cross section, when the water tries to penetrate into the interior of the housing from the bottom. However, such a float valve for discharging the condensate on the floor area of the housing is sensitive to fouling, so that, on the one hand, the condensate discharge can be degraded, and, on the other hand, the penetration of water into the housing can be facilitated. The latter can become a problem, in particular under so-called fording conditions, because a dirty float valve can no longer reliably close the opening of the valve. Therefore, the object of the present invention is to propose a solution that can provide for the condensate to be discharged in a more reliable way from a housing of a motor vehicle that is sealed off from the environment. An additional object of the present invention is to provide a housing that makes it possible to implement the condensate discharge with a design that is simple and cost effective. Another object of the present invention consists of providing a motor vehicle exhibiting an improved condensate discharge.

These objects are achieved with a device for discharging a condensate in the form of a condensate trap for a housing of a motor vehicle that is sealed off from the environment, wherein the housing is provided for accommodating a technical component, in particular a power storage module. The device according to the invention has a reservoir for accommodating the condensate formed in or on the floor of the housing, and this reservoir forms the lowest point of the floor in a predefined installation situation of the housing. In this context the reservoir is separated from the interior of the housing by a cover, which is provided with at least one breakthrough as an inlet for the condensate accumulating in the interior, and wherein an outlet opening of the reservoir is coupled to an actively actuable element for discharging a condensate.

The inventive condensate discharge by use of a condensate trap allows an implementation with small dimensions. In particular, it is possible to realize housings with a low profile and large installation area. The cover of the reservoir ensures that even transversal and/or longitudinal vehicle acceleration will not cause the condensate, contained in the reservoir of the condensate trap, to run back into the interior of the housing. The actively actuable element for discharging a condensate ensures that the reservoir is closed, except for those periods of time, when the element is actively actuated. Thus, the penetration of water into the interior of the housing, for example, in the course of cleaning a vehicle with a high pressure cleaner, through the outlet opening of the reservoir is ruled out. In addition and beyond this feature, damage to the condensate discharge system, for example, by way of a high pressure cleaner, is virtually ruled out. The actively actuable element makes it possible to control the discharge of the condensate, as required. For example, the condensate is discharged, only if such a discharge is necessary, for example, because a certain amount of condensate has collected in the interior of the reservoir. As a result, this feature also offers a number of diagnostic possibilities.

A practical embodiment provides that the reservoir extends over the entire width of the floor. Thus, it is guaranteed that any condensate falling on the floor of the housing will flow sooner or later into the reservoir.

In particular, it is provided that in the predefined installation situation of the housing in a vehicle, the direction of extension of the reservoir extends transversely to a longitudinal axis of the vehicle. As a result, the longitudinal dynamics of the vehicle can be used to force the condensate, accumulating on the floor of the interior of the housing, in the direction of the reservoir.

A practical embodiment provides that in the predefined installation situation of the housing the reservoir is arranged in relation to the longitudinal axis of the vehicle in the rear third, in particular on the rear end. This feature allows, in particular, the acceleration phases of a vehicle to be utilized to drive the condensate in the direction of the reservoir. In principle, the reservoir could also be arranged in the front third, in particular, on the front end, of the floor of the housing, in order to achieve a "transport" of the condensate in the direction of the reservoir in the braking phases. However, tests have demonstrated that the former variant is the preferred option.

The reservoir is especially easy to manufacture in or on the floor of the housing, when the reservoir is formed by an embossing of the floor. The only requirement for manufacturing the reservoir is a modified embossing die. Thus, the costs incurred to provide the condensate trap are minimal, compared to the costs for a conventional housing.

As an alternative, the reservoir is formed by the position of the floor relative to an area that lies in the horizontal plane. According to this embodiment, the reservoir is provided just by means of the relative arrangement of the housing in the vehicle.

According to an additional practical embodiment, the at least one breakthrough has a collar, so that the opening cross section of the breakthrough that faces the interior of the housing is larger than the opening cross section of the breakthrough that faces the reservoir. The result of this arrangement is that the condensate, which may be found in the reservoir, can be easily prevented from flowing back into the interior of the housing, or this backflow can at least be minimized.

An additional practical embodiment provides that the actively actuable element closes the outlet opening of the reservoir, when the actively actuable element is not activated. This feature makes it possible to arrange the outlet opening of the reservoir below a fording line of a motor vehicle, because even under fording conditions the water is prevented from penetrating into the interior of the housing.

In another advantageous variant the actively actuable element is activated at predefined time intervals for discharging the condensate in the reservoir. As a result, it is possible to control the discharge of the condensate, as required. The activation of the actively actuable element can take place, for example, once a day, once a week or once a month. In general, the activation can take place as a function of the necessity to discharge the condensate, and this necessity can also be determined by use of sensor technology.

In a first variant, the actively actuable element is a pump with an inlet that is connected to the outlet opening of the reservoir. An outlet of the pump is located preferably above a predefined fording line in the predefined installation situation of the housing and the pump. This feature can prevent the water from flowing back through the pump in the direction of the interior of the housing without any additional design measures. An especially simple and cost effective implementation of the actively actuable element as a pump can be achieved, when the pump is a windshield wiper water pump. This windshield wiper water pump can be provided as a standardized component in a variety of sizes and designs.

In a second variant, the actively actuable element is a valve, which upon activation opens the outlet opening, which is arranged at the bottom in the reservoir in the direction of gravity, and, upon deactivation, closes the outlet opening. In particular, the second variant provides that the valve can be operated magnetically. In order to be able to solve the problem of sealing off the interior of the housing against the environment, it is preferred that a valve tappet of the valve rests against a seal, surrounding the outlet opening, when the valve is deactivated.

It is self-evident that in the two variants of the actively actuable element the outlet opening is arranged at the lowest point of the reservoir in the respectively predefined installation situation, in order to be able to carry out the condensate discharge in the event that the element is actuated.

Furthermore, the invention provides a housing for one or more power storage modules, in particular, for a motor vehicle, and this housing is distinguished by a condensate trap of the type described above. The housing is, for example, a power storage module housing for motor vehicles, which have a hybrid drive or an electric drive. The housing according to the invention has the same advantages as the housings described in connection with the pressure compensation element according to the invention.

Furthermore, the invention provides a motor vehicle with a device for supplying power. In this context a housing of the device for supplying the power has a condensate trap of the type described above. The motor vehicle is, in particular, a motor vehicle that is provided with an electric drive or a hybrid drive.

The invention is explained in detail below with reference to an exemplary embodiment in the drawings.

DETAILED DESCRIPTION OF THE DRAWINGS

Figure 1:
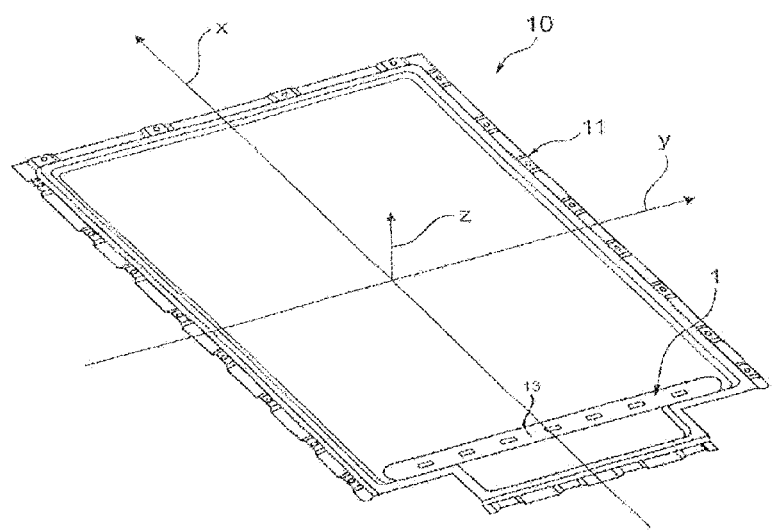
FIG. 1 is a perspective, schematic drawing of a floor of a housing that is equipped with an exemplary condensate trap according to the invention and that is intended for a motor vehicle, which is provided for accommodating a technical component, such as a power storage module.

FIG. 1 is a perspective view of an inventive arrangement for discharging a condensate in the form of a condensate trap 1 in a floor 11 of a housing 10 that is sealed off (not shown in the Figure) from the environment of a motor vehicle. The housing 10 represents, for example, a power storage module housing for accommodating one or more power storage modules of a motor vehicle such as battery cells or capacitors. The power storage module(s) is (are) used, for example, to provide an electric drive function in a hybrid vehicle or in an electric vehicle. The housing 10 or, more specifically, its floor 11 is made preferably of a metal, in particular, aluminum. The housing 10 is designed in such a way that the housing is pressure tight up to a predefined pressure, for example, caused by a degassing process of a power storage cell of one of the power storage modules.

Figure 2:
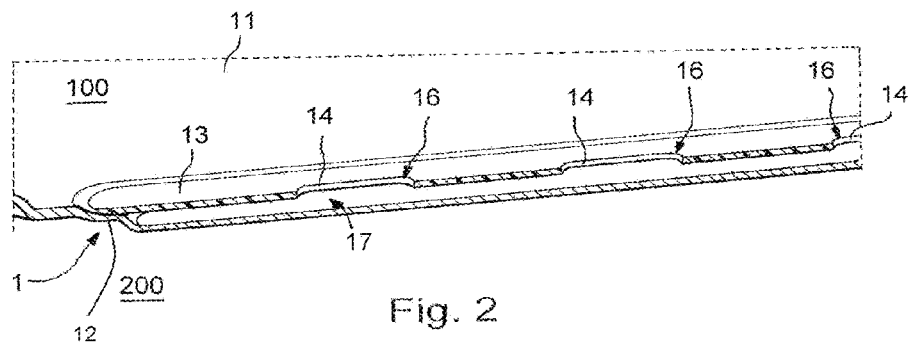
FIG. 2 is a schematic, perspective cross sectional drawing of the exemplary condensate trap according to the invention.

The condensate trap 1 has a reservoir 12 for accommodating the condensate, a feature that is easier to perceive from the perspective cross sectional view in FIG. 2. The reservoir 12 can be provided, for example, by providing the floor 11 with an embossing. In the given installation situation of the housing 10, in which the floor 11 is arranged (as shown in FIG. 1) typically parallel to an x-y plane of a coordinate system of a motor vehicle, the reservoir forms the lowest point of the floor 11. The size of the reservoir 12, in particular its depth, can be dimensioned according to the amount of condensate that can be expected inside the housing. In any case a housing 10 with a low profile can be implemented through integration of the condensate trap 1 according to the invention.

In the given installation situation the reservoir 12 extends over the entire width of the floor 11, preferably in the direction of the transverse axis of the vehicle (that is, in the y direction of the coordinate system shown in FIG. 1), in order to facilitate the collection of the condensate. In order to "force" the condensate, which may be found on the floor 11 of the housing 10, in the direction of the reservoir 12, the longitudinal dynamics of the vehicle are used. Therefore, in the given installation situation of the housing, the reservoir 12 is arranged relative to the longitudinal axis x of the vehicle preferably in the rear third, in particular on the rear end. However, the reservoir 12 could also be arranged, subject to the use of the braking phases of the vehicle, transversely to the longitudinal axis x of the vehicle in the front third, in particular on the front end of the floor 11.

The reservoir 12 is also arranged preferably on the rear edge of the floor 11, because then the reservoir 12 comes to rest below the manifold ducts of a cooler of the power storage modules arranged in the housing. The result of this arrangement is that under some circumstances the major portion of the condensate, accumulating in the interior of the housing, can flow directly into the reservoir without having to be collected on the floor.

In order to prevent the condensate that has collected in the reservoir 12 from flowing back into the interior of the power storage module housing because of the driving dynamics of the motor vehicle, the reservoir 12 is separated from the interior 100 of the housing by a covering 13 in the form of a cover. The cover 13 is provided with at least one breakthrough 14 as an inlet for the condensate present in the interior of the housing. The cover 13 is made preferably of a synthetic plastic material.

In the exemplary embodiment from FIGS. 1 and 2, the breakthroughs 14 are configured in the form of oblong holes and are arranged on the cover 13 along an axis that extends parallel to the transverse axis y of the vehicle. Each of the breakthroughs 14 has a collar 16, so that the opening cross section of the breakthrough that faces the interior 100 of the housing is larger than the opening cross section of the breakthrough that faces the reservoir 12. Even though this arrangement makes it easier for the condensate to seep into the reservoir 12, the passage of the condensate in the reverse direction, i.e. in the direction of the interior 100 of the housing, is rendered more difficult. This feature makes it possible to prevent the condensate, which may be found in the reservoir 12, from flowing back into the interior 100 of the housing or at least to minimize this backflow. This embodiment is shown very clearly, in particular, in FIG. 2.

An outflow opening 17 of the reservoir 12 is coupled to an actively actuable element 20 for discharging condensate. In the given installation situation of the housing, the outflow opening 17 of the reservoir 12 is arranged preferably at the lowest point of the reservoir, so that it is ensured that the reservoir can be emptied, when the element 20 is actuated.

The actively actuable element 20 is activated preferably at predefined time intervals for discharging the condensate in the reservoir. The activation can take place, for example, once a day, once a week or once a month. Similarly, the volume of condensate in the reservoir 12 can be determined by use of sensors, in order to actuate the element 20 as a function of the detection that a predefined volume has been exceeded.

Figure 3:
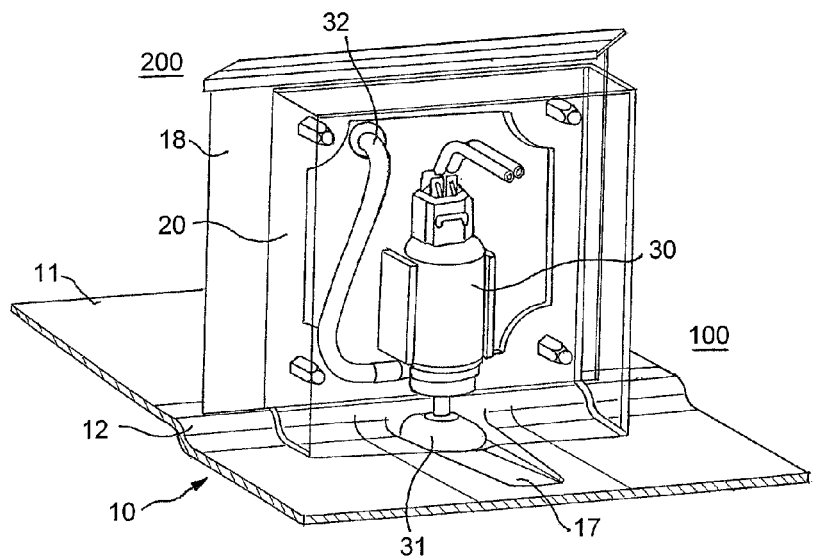
FIG. 3 shows an actively actuable element, which is provided in a condensate trap according to the invention, and which is intended for discharging the condensate, in a first alternative embodiment.
Figure 4:
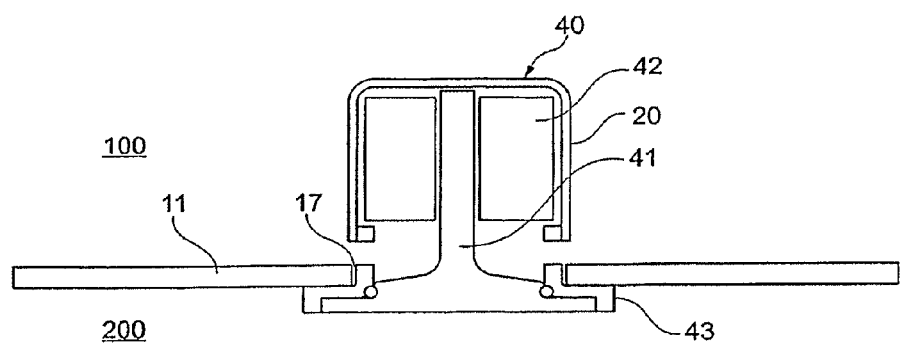
FIG. 4 shows an actively actuable element, which is provided in a condensate trap according to the invention and which is intended for discharging the condensate, in a second alternative embodiment.

FIGS. 3 and 4 show two exemplary embodiments of the actively actuable element 20 for discharging the condensate from the reservoir 12. Both variants ensure that the element 20 closes the outflow opening 17 of the reservoir, when the element is not activated.

In the embodiment shown in FIG. 3, a windshield wiper water pump 30 is provided as the pump, and this windshield wiper water pump transports the condensate from the reservoir. An inlet 31 of the windshield wiper water pump 30 is coupled to the outlet opening 17 of the reservoir 12, in order to enable the intake of the condensate that may be found in the reservoir. An outlet 32 of the windshield wiper water pump 30 is arranged in the direction of gravity above the inlet 31 and preferably above a defined fording line of the motor vehicle. This arrangement eliminates the need for special check valves in the pump, in order to ensure that the water does not penetrate into the interior 100 of the housing, for example, under fording conditions. The windshield wiper water pump can be arranged, for example, on a housing wall 18 in the interior of the housing 10. An arrangement outside the housing is also contemplated.

In the exemplary embodiment shown in FIG. 4, the condensate discharge is performed by a valve 40. The valve 40 is designed as a lift solenoid valve. A valve tappet 41 closes a drill hole, which is arranged in the area of the outlet opening 17 and is provided with a seal 43 on the peripheral side, when the valve 40 is not activated. In order to secure that the interior of the housing is sealed off from the environment, the valve tappet 41 rests against the seal 43 surrounding the outlet opening 17, when the valve is deactivated. A magnet of the lift solenoid valve 40 is marked with the reference numeral 42, and when actuated, this magnet causes the valve tappet 41 to detach itself from the seal 43, or more specifically from the drill hole. When the valve is open, the condensate, which may be found in the reservoir, can drain downwards owing to the effect of gravity.

Even in the case of housings, in particular power storage module housings, of a motor vehicle with a low profile and large floor area, the above described condensate trap ensures that the condensate will be collected and held at the discharge position. The actively actuable elements 20, which effect the condensate discharge, cannot be damaged by mechanical influences, such as the water jet of a high pressure cleaner, so that the function of the condensate discharge is guaranteed for a long period of time.

The condensate discharge can be controlled, as required, through the implementation of a sensor in the condensate trap. In this case the condensate is discharged, only if it is necessary. The provision of a sensor in the condensate trap offers a multitude of diagnostic possibilities, in particular with respect to the amount of condensate, accumulating in the housing, as a function of the operating states and/or the driving states of the motor vehicle, in which the housing is provided.

LIST OF REFERENCE NUMERALS 1 condensate trap
10 housing
11 floor
12 reservoir
13 cover
14 breakthrough
16 collar
17 outlet opening
18 housing wall
20 actively actuable element
30 pump
31 inlet
32 outlet
40 valve
41 valve tappet
42 lift solenoid valve
43 seal
100 interior of the housing
200 environment

The invention claimed is:
1. A device for discharging condensate for a motor vehicle, comprising:
a housing configured to accommodate therewithin a technical component of the motor vehicle, the housing being sealed-off from an environment;

a reservoir formed in or on a floor of the housing, the technical component resting on the floor of the housing, the reservoir being configured to form a lowest point of the floor in a predefined installation situation of the housing;

a cover separating the reservoir from an interior of the housing, the cover having at least one breakthrough forming an inlet for condensate accumulating in the interior of the housing; and an actively actuated element operatively configured to discharge the condensate, the actively actuated element being coupled to an outlet opening of the reservoir.

2. The device according to claim 1, wherein, in the predefined installation situation of the housing, a longitudinal axis of the reservoir extends transversely to a longitudinal axis of the vehicle.

3. The device according to claim 2, wherein, in the predefined installation situation of the housing, the reservoir is arranged in a rear third of the vehicle relative to the longitudinal axis.

4. The device according to claim 1, wherein the reservoir is formed by an embossing of the floor.

5. The device according to claim 1, wherein the reservoir is formed by a position of the floor relative to an area lying in a horizontal plane.

6. The device according to claim 1, wherein the breakthrough has a collar configured such that a cross section facing the interior of the housing is larger than an opening cross section facing the reservoir.

7. The device according to claim 1, wherein the actively actuated element is operatively configured to close the outlet opening of the reservoir when inactive.

8. The device according to claim 1, wherein the actively actuated element is operatively configured to be activated at predefined time intervals to discharge the condensate in the reservoir.

9. The device according to claim 1, wherein the actively actuated element is a pump having an inlet coupled to the outlet opening of the reservoir.

10. The device according to claim 9, wherein the pump is a windshield wiper water pump.

11. The device according to claim 1, wherein the actively actuated element is a valve operatively configured to open the outlet opening of the reservoir upon activation, the valve being arranged at a bottom in the reservoir and, upon deactivation, the valve closes the outlet opening.

12. The device according to claim 11, wherein the valve is a magnetically operated valve.

13. The device according to claim 11, wherein a valve tappet of the valve rests against a seal surrounding the outlet opening when the valve is deactivated.

14. The device according to claim 1, wherein the technical component is a power storage module for the motor vehicle.

15. A motor vehicle, comprising:

a power supply device for the motor vehicle;

a housing configured to accommodate therewithin the power supplying device of the motor vehicle, the housing being sealed-off from an environment;

a reservoir formed in or on a floor of the housing, the power supplying device resting on the floor of the housing, the reservoir being configured to form a lowest point of the floor in a predefined installation situation of the housing;

a cover separating the reservoir from an interior of the housing, the cover having at least one breakthrough forming an inlet for condensate accumulating in the interior of the housing; and an actively actuated element operatively configured to discharge the condensate, the actively actuated element being coupled to an outlet opening of the reservoir.

16. A device for discharging condensate for a motor vehicle, comprising:

a housing configured to accommodate therewithin a technical component of the motor vehicle, the housing being sealed-off from an environment;

a reservoir that: i) is configured to store the condensate, ii) is formed by a stamped depression on a floor of the housing, and iii) is configured to form a lowest point of the floor in a predefined installation situation of the housing;

a cover that is positioned above the lowest point of the floor and that separates an interior of the reservoir from an interior of the housing, the cover having at least one breakthrough forming an inlet for the condensate that accumulates in the interior of the housing; and an actively actuated element operatively configured to discharge the condensate, the actively actuated element being coupled to an outlet opening of the reservoir, wherein the technical component of the vehicle rests on the floor of the housing.

* * * * *